United States Patent
Kurita

(10) Patent No.: US 8,290,350 B2
(45) Date of Patent: Oct. 16, 2012

(54) VIDEO DISPLAY APPARATUS, VIDEO PLAYBACK APPARATUS AND METHOD FOR CONTROLLING THE SAME

(75) Inventor: Masanao Kurita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 564 days.

(21) Appl. No.: 12/361,091

(22) Filed: Jan. 28, 2009

(65) Prior Publication Data

US 2009/0196573 A1    Aug. 6, 2009

(30) Foreign Application Priority Data

Feb. 5, 2008   (JP) .................................. 2008-025237

(51) Int. Cl.
*H04N 7/00*    (2011.01)
(52) U.S. Cl. ........................................................ 386/343
(58) Field of Classification Search .................. None
See application file for complete search history.

(56) References Cited

U.S. PATENT DOCUMENTS

| 7,826,710 | B2 * | 11/2010 | Itani .............................. 386/343 |
| 2006/0146040 | A1 * | 7/2006 | Shen ............................ 345/204 |
| 2008/0091713 | A1 * | 4/2008 | Candelore et al. ........ 707/103 R |

FOREIGN PATENT DOCUMENTS

| JP | 2001-054066 A | 2/2001 |
| JP | 2003-259333 A | 9/2003 |
| JP | 2006-109113 A | 4/2006 |
| JP | 2007-528012 A | 10/2007 |

* cited by examiner

*Primary Examiner* — Thai Tran
*Assistant Examiner* — Sunghyoun Park
(74) *Attorney, Agent, or Firm* — Canon USA, Inc., IP Division

(57) ABSTRACT

A video display apparatus adapted to be connected to a video playback apparatus having a first frame rate conversion unit configured to convert a frame rate of video data, includes a second frame rate conversion unit configured to convert a frame rate of the video data which is input from the video playback apparatus, and a control unit configured to control and associate operations in the first frame rate conversion unit and the second frame rate conversion unit in response to a request for performing a trick playback of the video data.

11 Claims, 14 Drawing Sheets

FIG.3

| DEVICE INFORMATION OF DVD PLAYER | | |
|---|---|---|
| FRAME INTERPOLATION EXECUTABLE BY FRAME INTERPOLATOR | FRAME-DOUBLING/ DECIMATING SETTING EXECUTABLE BY FRAME-DOUBLING/ DECIMATING UNIT | FRAME RATE AVAILABLE TO BE OUTPUT BY TRANSMISSION UNIT |
| 15/2 → 15 fps | 15 ⇔ 30 fps | 15 fps |
| 15 → 30 fps | 30 ⇔ 60 fps | 30 fps |
| 30 → 60 fps | 60 ⇔ 120 fps | 60 fps |
| — | 120 ⇔ 240 fps | 120 fps |

FIG.4

| DEVICE INFORMATION OF TV SET | | |
|---|---|---|
| FRAME RATE AVAILABLE TO BE INPUT BY RECEIVING UNIT | FRAME INTERPOLATION EXECUTABLE BY FRAME INTERPOLATOR | FRAME RATE AVAILABLE TO BE DISPLAYED BY DISPLAY UNIT OF TV SET |
| 15 fps | 30 ⇔ 60 fps | 60 fps |
| 30 fps | 60 ⇔ 120 fps | 120 fps |
| 60 fps | 120 ⇔ 240 fps | — |
| 120 fps | — | — |

FIG.6

| | | FRAME INTERPOLATOR OF DVD PLAYER | FRAME-DOUBLING/ DECIMATING UNIT | TRANSMISSION UNIT AND RECEIVING UNIT | FRAME INTERPOLATOR OF TV SET | DISPLAY UNIT OF TV SET |
|---|---|---|---|---|---|---|
| NORMAL PLAYBACK | | OFF | OFF | 60 fps | ON (60 → 120 fps) | 120 fps |
| FAST FORWARD PLAYBACK | x2 | OFF | OFF | 120 fps | OFF | 120 fps |
| | x4 | OFF | ON (240 → 120 fps) | 120 fps | OFF | 120 fps |
| SLOW PLAYBACK | x1/2 | ON (30 → 60 fps) | OFF | 60 fps | ON (60 → 120 fps) | 120 fps |
| | x1/4 | ON (15 → 30 fps) | OFF | 30 fps | ON (30 → 60 fps) | 60 fps |

VIDEO DISPLAY APPARATUS, VIDEO PLAYBACK APPARATUS AND METHOD FOR CONTROLLING THE SAME

BACKGROUND OF THE INVENTION

1. Field of the Invention

The present invention relates to a video playback apparatus and a video display apparatus which reproduce and display an original video in a trick playback mode, such as a fast forward playback mode and a slow playback mode, and also relates to a method for controlling these apparatuses.

2. Description of the Related Art

A television (TV) set which can display video at a high frame rate has recently been commercialized for improving a response of moving images. The TV set converts video signals of 60 frames per second (fps) input from a playback device such as a digital versatile disc (DVD) player into video signals of 120 fps by a built-in frame interpolator and displays the video signals on a screen.

When the video signals recorded in a DVD is reproduced in a trick playback mode, the DVD player adjusts the frame rate by decimating frames in a fast forward playback mode and by doubling the frames in a slow playback mode. The video signals thus, can be output in a fixed frame rate, regardless of a normal playback mode or the trick playback mode, and it enables any type of display device to reproduce and display the video signals.

Japanese Patent Application Laid-Open No. 2001-054066 discusses a video display system which changes decoding processing speed in the fast forward playback mode and the slow playback mode, and rewrites a video random access memory (VRAM) at a different frame rate.

Japanese Patent Application Publication No. 2007-528012 discusses a display method which switches a display scan mode in response to the trick playback mode.

According to a conventional trick playback method, however, the display image reproduced in the trick playback mode does not always have a high image quality in a case where the video from a playback device that can perform a high frame rate playback is displayed by a display device that can display the video at the high frame rate.

FIG. 11 illustrates device setting and a transition of the frame rate in a conventional 2× speed fast forward playback mode. A DVD playback unit 3 reproduces an original video data of 60 fps which is recorded in a DVD by 2× speed fast forward playback, and the original data is converted to playback video data of 120 fps. Since an output video frame rate from a transmission unit 6 is normally fixed at 60 fps, the output video frame rate is decimated and output by a frame doubling/decimating unit 5. Input video data of 60 fps received by a receiving unit 32 in a TV set 31 is converted to the video data with the frame rate of 120 fps by a frame interpolator 34, and displayed.

FIG. 12 schematically illustrates frame images to be displayed. Since the frame images are interpolated after odd-numbered frames of the original video data are decimated, reproducibility of the displayed video is poor.

FIG. 13 illustrates the device setting and a transition of the frame rate at a conventional ¼× speed slow playback mode. A DVD playback unit 3 reproduces the original video data of 60 fps which is recorded in a DVD by ¼× speed slow playback, and the original data is converted to the playback video data of 15 fps. Since the video frame rate from a transmission unit 6 is normally fixed at 60 fps, a frame interpolator 4 and a frame doubling/decimating unit 5 are turned on and the interpolated and doubled video data is output. The video data of 60 fps received by a receiving unit 32 of a TV set 31 is converted to the video data with the frame rate of 120 fps by a frame interpolator 34 and displayed.

FIG. 14 schematically illustrates the frame images to be displayed. An interpolated frame image processed by the frame interpolator 4, a doubled frame image processed by the frame doubling/decimating unit 5, and an interpolated frame image processed by the frame interpolator 34 are inserted between frame images of the original video data. As a result, smoothness of the video to be displayed is lost because three similar frame images continue.

SUMMARY OF THE INVENTION

The present invention is directed to displaying a high-quality trick playback video by exchanging device information of a playback device and a display device and controlling and associating operations of their respective frame rate conversion units in response to a request for a trick playback.

According to an aspect of the present invention, a video display apparatus adapted to be connected to a video playback apparatus having a first frame rate conversion unit configured to convert a frame rate of video data, includes a second frame rate conversion unit configured to convert a frame rate of the video data which is input from the video playback apparatus, and a control unit configured to control and associate operations in the first frame rate conversion unit and the second frame rate conversion unit in response to a request for performing a trick playback of the video data.

According to another aspect of the present invention, a video playback apparatus adapted to be connected to a video display apparatus having a second frame rate conversion unit configured to convert a frame rate of input video data, includes a playback unit configured to reproduce video data recorded in a recording media and output playback video data, the first frame rate conversion unit configured to convert a frame rate of the playback video data, and a control unit configured to control and associate operations in the first frame rate conversion unit and the second frame rate conversion unit in response to a request for performing a trick playback of the video data.

According to an exemplary embodiment of the present invention, video is displayed with a smooth motion when a recorded video is reproduced in a trick playback.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a table illustrating device information of a DVD player.

FIG. 4 is a table illustrating device information of a TV set.

FIG. 6 is an example of a device setting table.

DETAILED DESCRIPTION OF THE EMBODIMENTS

Various exemplary embodiments, features, and aspects of the invention will be described in detail below with reference to the drawings.

Figure 1:
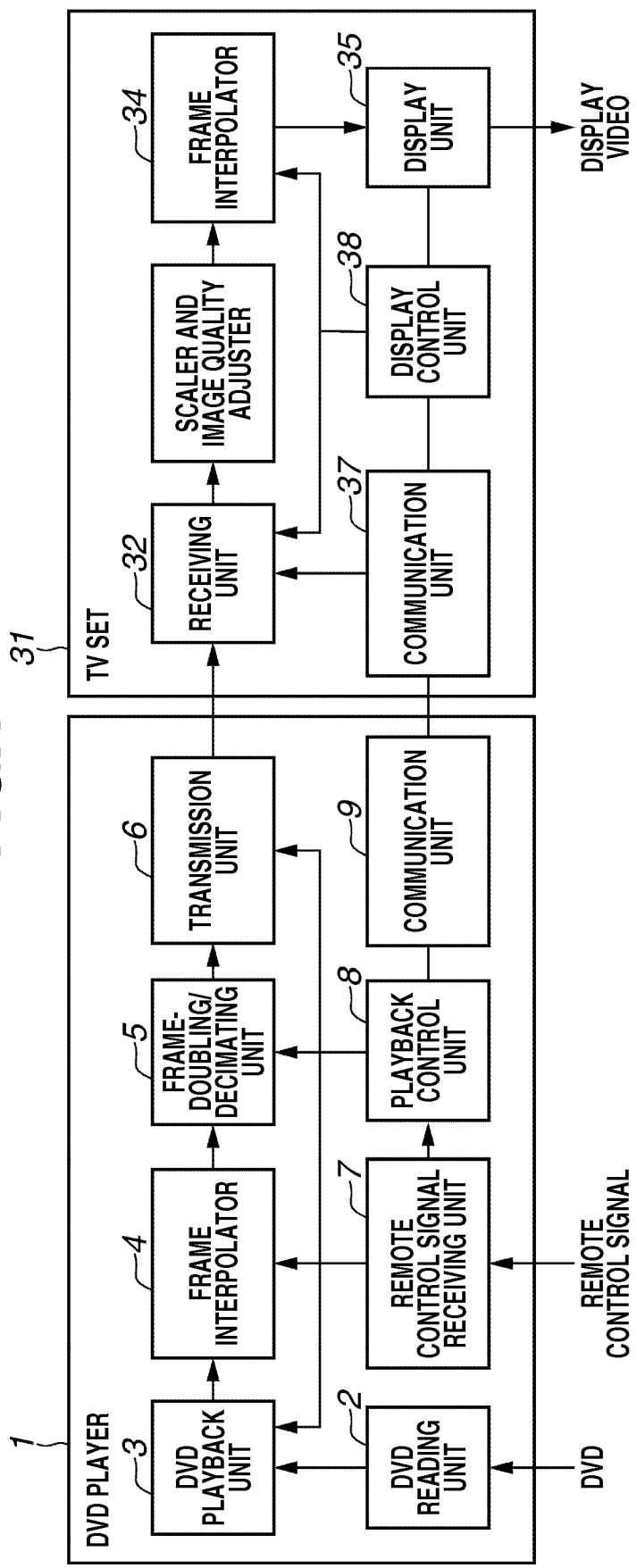
FIG. 1 is a block diagram illustrating a video playback apparatus and a video display apparatus according to an exemplary embodiment of the present invention.

FIG. 1 is a block diagram of a video playback apparatus and a video display apparatus which can be connected to each other according to an exemplary embodiment of the present invention. A DVD player 1 as a video playback apparatus and a TV set 31 as a video display apparatus are connected to each other via an interface. However, the TV set 31 and the DVD player 1 are not necessarily separate bodies. That is, the DVD player 1 can be mounted in the TV set 31. A DVD as a recording media recording original video data is inserted into a DVD reading unit 2, and then a DVD playback unit 3 outputs the original video data recorded in the DVD as playback video data. A user selects a playback operation system using a remote controller, either in a normal playback operation or a trick playback operation (fast forward playback, or slow playback). A remote control signal receiving unit 7 receives remote control signals. A playback control unit 8 performs setting of playback speed of the DVD playback unit 3, a frame interpolator 4, a frame doubling/decimating unit 5, and a transmission unit 6 according to a user operation of the remote controller.

Alternatively, a display control unit 38 can perform settings of the playback speed of the DVD playback unit 3, the frame interpolators 4 and 34, the frame doubling/decimating unit 5, and the transmission unit 6 according to the user operation using a remote controller of the TV set 31.

As a communication interface between the transmission unit 6 and a receiving unit 32, a high-definition multimedia interface (HDMI) can be used. Video data and control commands are communicated between the DVD player 1 and the TV set 31 via the HDMI. The display control unit 38 of the TV set 31 controls the receiving unit 32, the frame interpolator 34, and a display unit 35. A communication unit 9 of the DVD player 1 and a communication unit 37 of the TV set 31 communicate device information and setting details of each unit to each other using a consumer electronics control (CEC) line of the HDMI. The display unit 35 is a display apparatus which is structured with a display panel such as a crystal panel, a plasma display panel, an electroluminescence panel, and can display video at a plurality of display frame rates.

Figure 2:
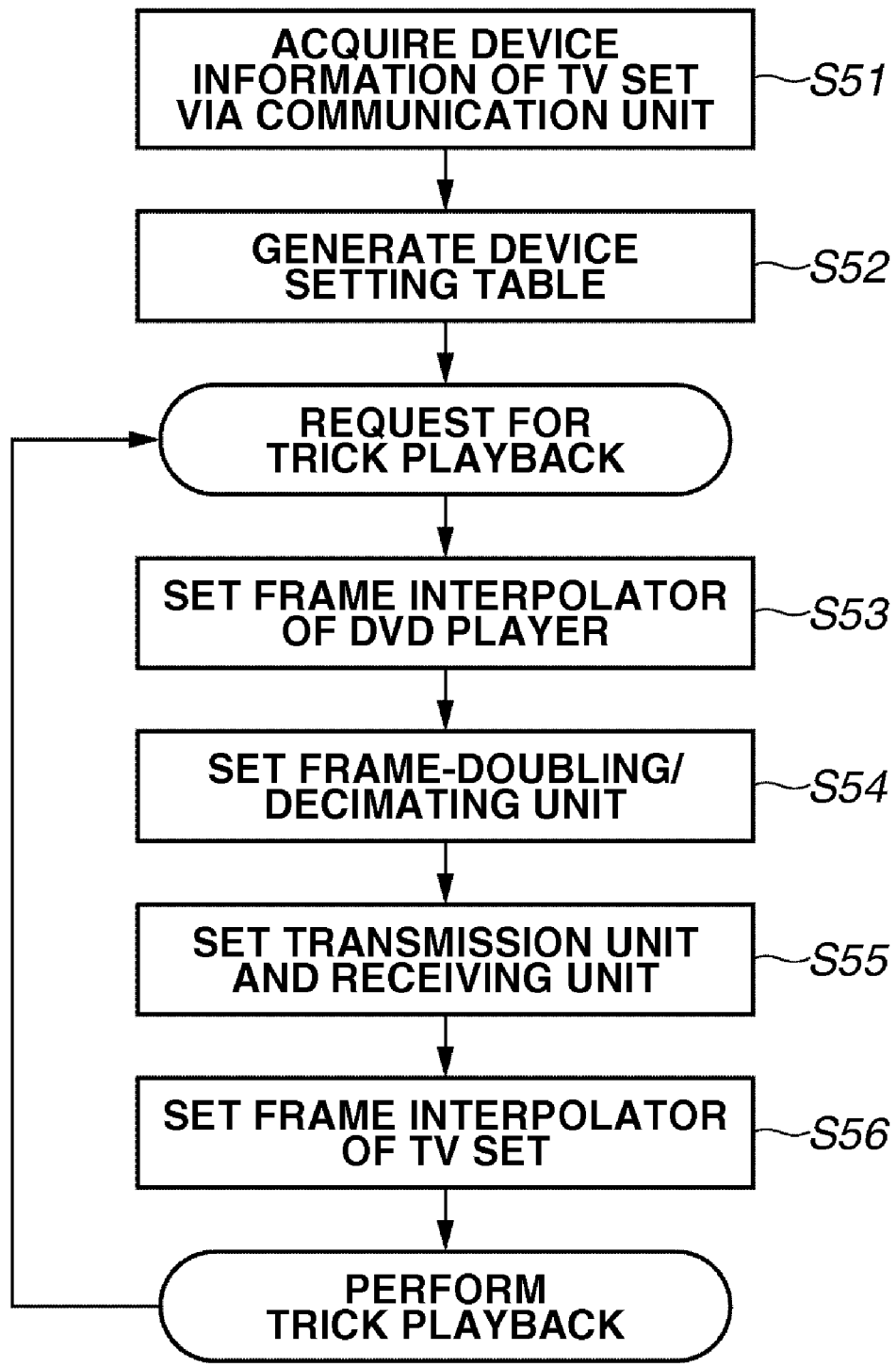
FIG. 2 is a flow chart illustrating processing procedures of the video playback apparatus and the video display apparatus according to the exemplary embodiment of the present invention.

FIG. 2 is a flow chart illustrating processing procedures in the DVD player 1 and the TV set 31. When the DVD player 1 and the TV set 31 are powered on, in step S51, the playback control unit 8 of the DVD player 1 communicates with the display control unit 38 of the TV set 31 via the communication unit 9, and acquires the device information of the TV set 31. The display control unit 8 of the TV set 31 can communicate with the playback control unit 8 of the DVD player 1 via the communication unit 37, and acquires the device information of the DVD player 1. As illustrated in FIG. 4, the device information of the TV set 31 includes a frame rate that can be received by the receiving unit 32, a setting of the frame rate which can be changed by the frame interpolator 34, and a display frame rate at the display unit 35.

Next, in step S52, the playback control unit 8 generates a device setting table which describes a device setting that can reproduce the video with the highest quality image at the time of performing the trick playback based on the acquired device information of the TV set 1 and the acquired device information of the DVD player 1. As illustrated in FIG. 3, the device information of the DVD player 1 includes a setting of the frame rate which can be changed by the frame interpolator 4, a setting for frame doubling/decimating which can be executed by the frame doubling/decimating unit 5, and an output frame rate which can be output by the transmission unit 6. The device setting table associates operations among the frame interpolator 4, the frame doubling/decimating unit 5, and the frame interpolator 34 with each other according to a playback mode of the trick playback.

FIG. 6 is a device setting table which describes operations of each block for obtaining a high-quality display image at the time of performing trick playback. The device setting table is stored in a memory unit in the playback control unit 8 or the display control unit 38. In the device setting table, the operations of each block corresponding to each playback mode such as a normal playback, a fast forward playback (×2, ×4, or more), and a slow playback (×½, ¼, or more) are described. Each block includes a frame rate conversion block (the frame interpolators 4 and 34, and the frame doubling/decimating unit 5), the transmission unit 6 and the receiving unit 32 of HDMI, and the display unit 35.

Figure 5:
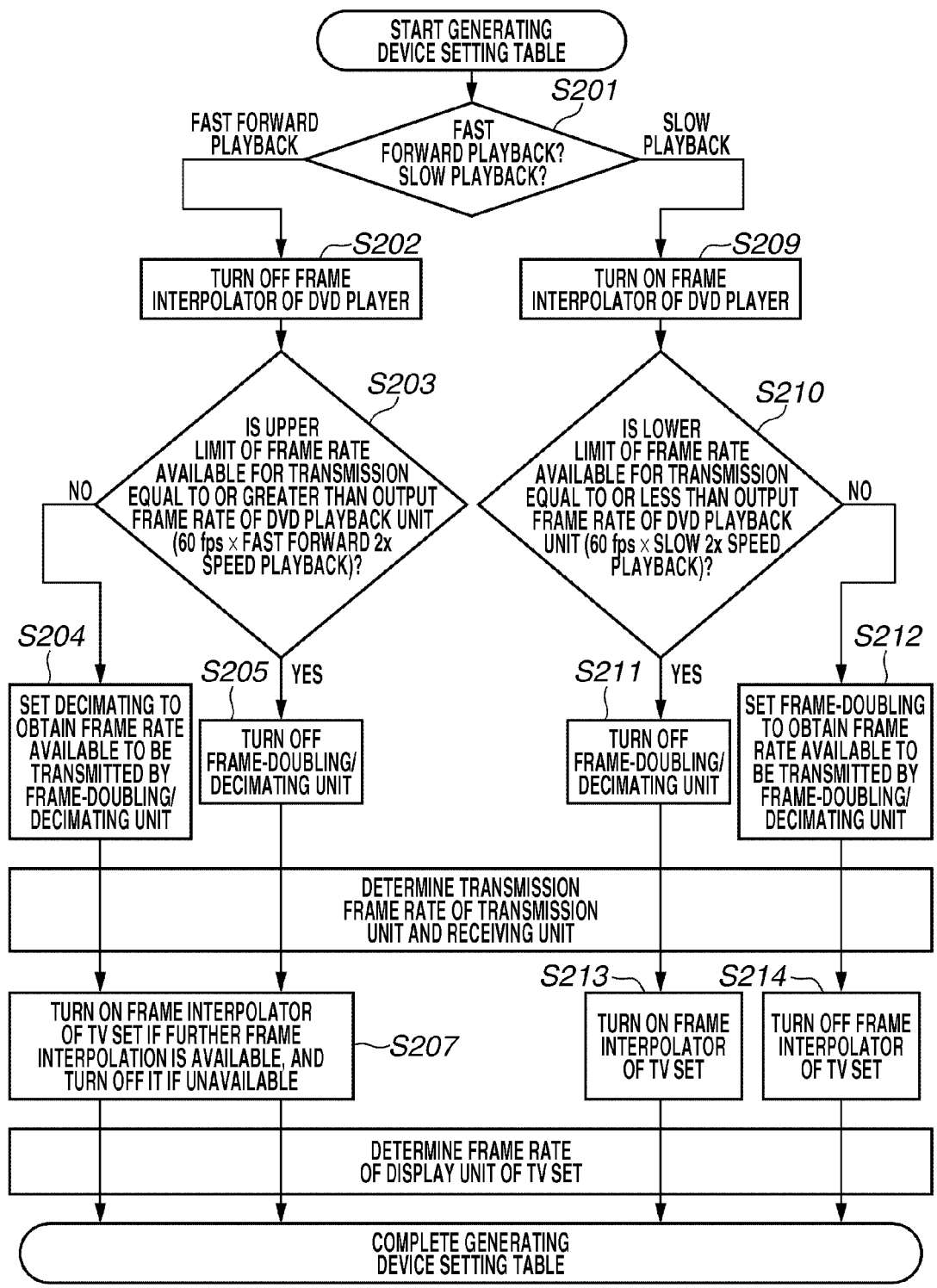
FIG. 5 is a flow chart illustrating procedures for generating a device setting table.

FIG. 5 illustrates a determination flow in generating the device setting table based on the device information of the TV set 31 and the DVD player 1. When it is determined in step S201 that the fast forward playback mode is set, then in step S202, the playback control unit 8 turns off the frame interpolator 4 of the DVD player 1. This is because the playback control unit 8 can increase the frame rate without performing interpolation during fast forward playback.

Next, in step S203, when it is determined that an upper limit of a frame rate available for transmission is equal to or greater than the output frame rate (60 fps×fast forward playback speed) of the DVD playback unit 3 (YES in step S203), the process proceeds to step S205. In step S205, the playback control unit 8 turns off the frame doubling/decimating unit 5 and outputs the video data as it is. When the upper limit of the frame rate available for transmission is less than the output frame rate of the DVD playback unit 3 (NO in step S203), the process proceeds to step S204. In step S204, the playback control unit 8 performs decimating of the video data to obtain the frame rate available for transmission by the frame doubling/decimating unit 5. The upper limit of the frame rate available for transmission is determined based on a transmission speed of HDMI.

In step S207, the display control unit 38 of the TV set 31 determines whether to turn on or off the frame interpolator 34 based on the information about frame interpolation which can be executed by the frame interpolator 34 and the display frame rate in the display unit 35. This operation relates to, for example, the operation of the TV set 31 in a case where the TV set 31 receives the video data of 120 fps at the fast forward playback speed of 2× from the DVD player 1. When the TV set 31 further executes the frame interpolation to the input video data to convert the frame rate to 240 fps and the display unit 35 can display the video at the converted frame rate, the video can be displayed at higher quality. It is not necessary to further perform the frame interpolation to 240 fps in a case where the TV set 31 receives the video data of 120 fps in the normal speed viewing. The display frame rate at the display unit 35 is determined as described above.

Returning to step S201, when it is determined that the slow playback mode is set, then in step S209, the playback control unit 8 turns on the frame interpolator 4 of the DVD player 1. It is because the DVD player 1 can improve the frame rate without damaging the image quality during the slow playback by executing the frame interpolation.

Next, in step S210, when it is determined that a lower limit of a frame rate available for transmission is equal to or less than the output frame rate (60 fps×slow playback speed) of the DVD playback unit 3 (YES in step S210), the process proceeds to step S211. In step S211, the playback control unit 8 turns off the frame doubling/decimating unit 5. When the lower limit of the frame rate available for transmission is greater than the output frame rate of the DVD playback unit 3 (NO in step S210), the process proceeds step S212. In step S211, the playback control unit 8 turns on the frame doubling/ decimating unit 5 and sets the frame doubling so that the frame rate available for transmission is obtained.

In a case where the playback control unit 8 turns off the frame doubling/decimating unit 5 (in step S211), the display control unit 38 of the TV set 31 turns on the frame interpolator 34 in step S213. In a case where the playback control unit 8 turns on the frame doubling/decimating unit 5 (in step S212), the display control unit 38 of the TV set 31 turns off the frame interpolator 34 in step S214.

According to the above described procedures, the device setting table is generated.

Returning to FIG. 2, when the user inputs a request for the trick playback using the remote controller, the play control unit 8 controls and associates the frame interpolator 4, the frame doubling/decimating unit 5, and the frame interpolator 34 based on the device setting table. In step S53, the playback control unit 8 sets the frame interpolator 4 of the DVD player 1. The playback control unit 8 turns off the frame interpolator 4 at the time of performing the fast forward playback, while the playback control unit 8 turns on the frame interpolator 4 at the time of performing the slow playback.

Next, in step S54, the playback control 8 performs the device setting of the frame doubling/decimating unit 5. The playback control unit 8 adjusts the device setting by frame doubling/decimating so as to provide the frame rates that can be transmitted and received by the output unit 6 and the receiving unit 32. However, this operation lowers the image quality, so that the frame doubling/decimating unit 5 is adjusted to be turned off to the utmost extent.

Next, in step S55, the playback control unit 8 sets a transmission frame rate for the transmission unit 6 and the receiving unit 32. In step S56, the playback control 8 sets the frame interpolator 34 of the TV set 31. The playback control unit 8 turns off the frame interpolator 34 at the fast forward playback, while the playback control unit 8 turns on the frame interpolator 34 at the time of performing the slow playback.

According to the above settings, the DVD playback unit 3 performs the trick playback based on the request, and the video based on the playback video data is displayed on the screen of the display unit 35.

A specific operation to be performed when the 2× speed fast forward playback is selected is described.

Figure 7:
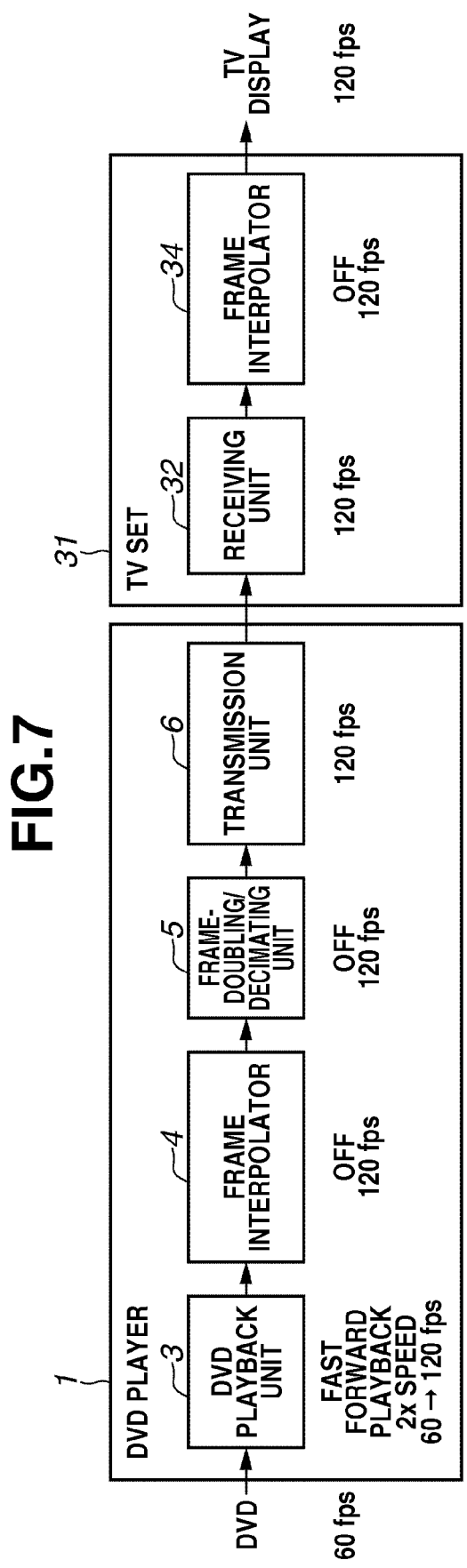
FIG. 7 is a diagram illustrating transition processes of a frame rate in a 2× speed fast forward playback mode according to the exemplary embodiment of the present invention.

FIG. 7 illustrates on-off operations and the transition of the frame rate of each block. The DVD playback unit 3 reproduces the original video data of 60 fps recorded in the DVD at the 2× speed fast forward playback, and the original video data is converted to the playback video data of 120 fps. The frame interpolator 4 and the frame doubling/decimating unit 5 are turned off, and the transmission unit 6 outputs the playback video data of 120 fps. The frame interpolator 34 of the TV set 31 is turned off, and the playback video data is finally displayed as the video at the display frame rate of 120 fps.

Since the playback video data of 120 fps is displayed in the display frame of 120 fps without executing the frame interpolation, the playback video data is displayed at the highest quality.

A specific operation to be performed when the ¼× speed slow playback is selected is described.

Figure 8:
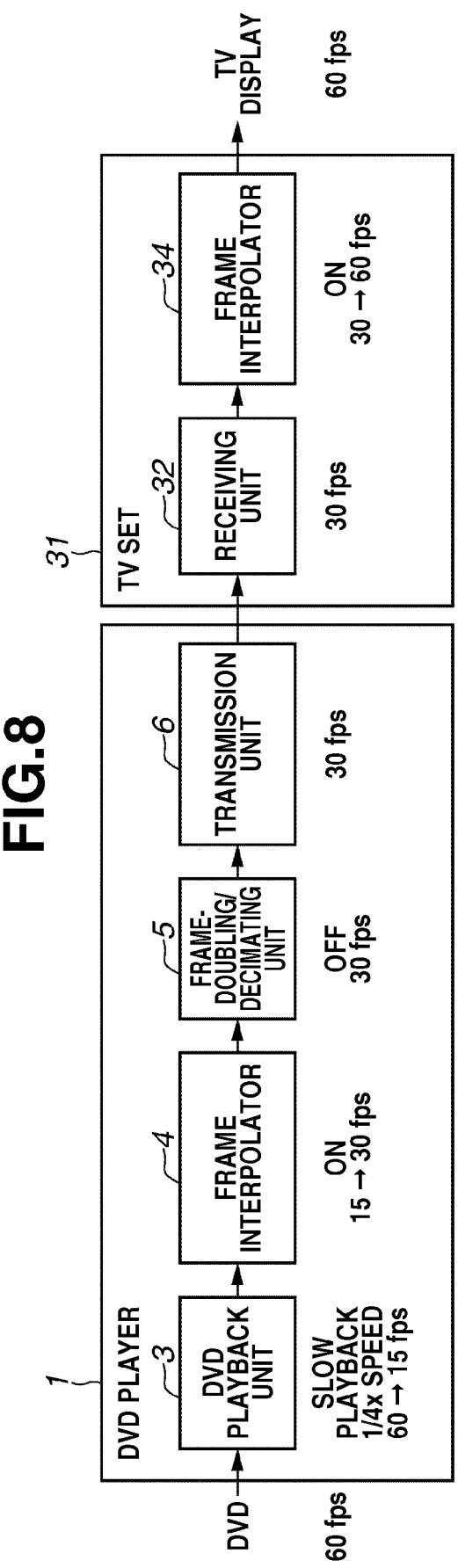
FIG. 8 is a diagram illustrating transition processes of a frame rate in a ¼× speed slow playback mode according to the exemplary embodiment of the present invention.

FIG. 8 illustrates on-off operations and the transition of the frame rate of each block. The DVD playback unit 3 reproduces the original video data of 60 fps recorded in the DVD at the ¼× speed slow playback, and the original video data is converted to the playback video data of 15 fps. The frame interpolator 4 is turned on while the frame doubling/decimating unit 5 is turned off, and the transmission unit 6 outputs the playback video data of 30 fps. The frame interpolator 34 of the TV set 31 is turned on, and the playback video data is finally displayed as the video at the display frame rate of 60 fps.

Figure 9:
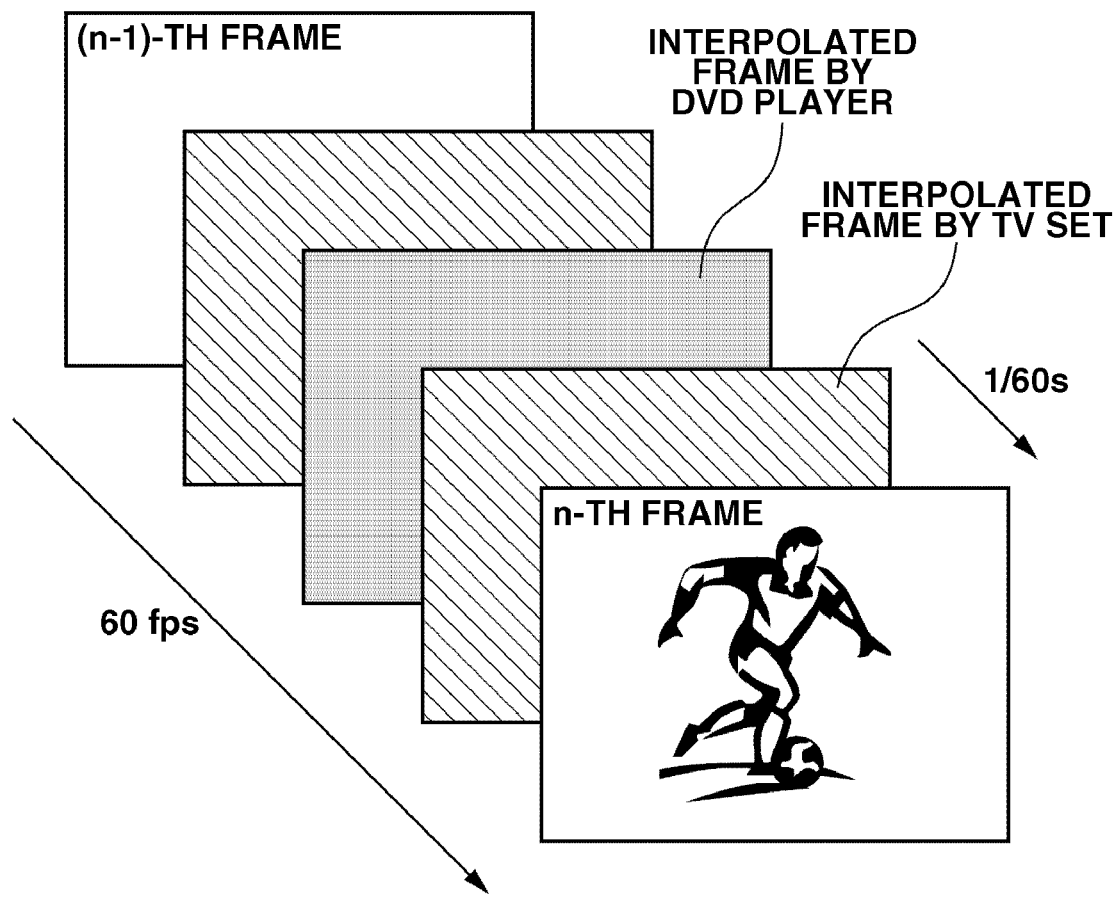
FIG. 9 is a diagram illustrating a display frame structure in the ¼× speed slow playback mode according to the exemplary embodiment of the present invention.
Figure 10:
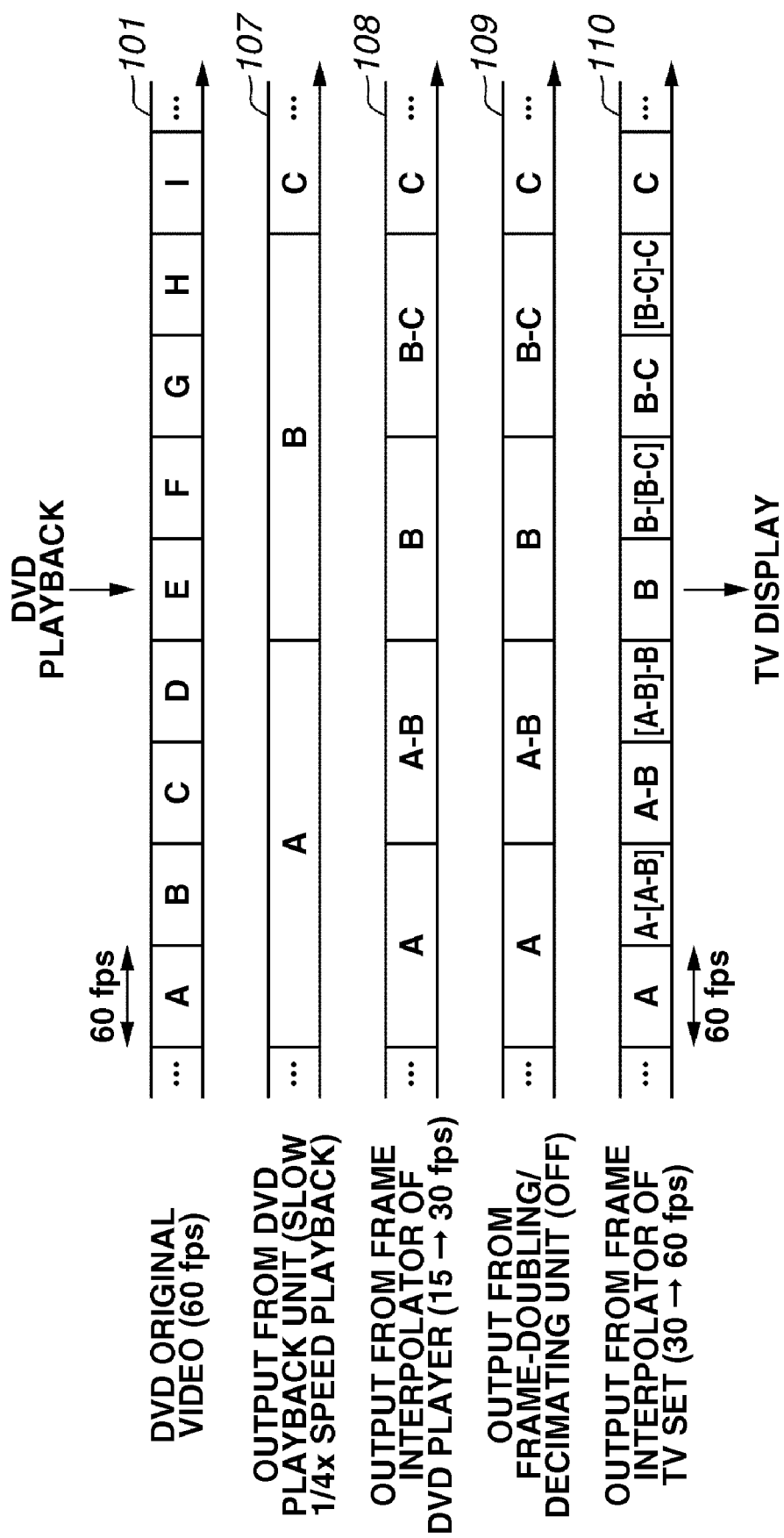
FIG. 10 is a diagram illustrating transition processes of a frame structure in the ¼× speed slow playback mode according to the exemplary embodiment of the present invention.
Figure 11:
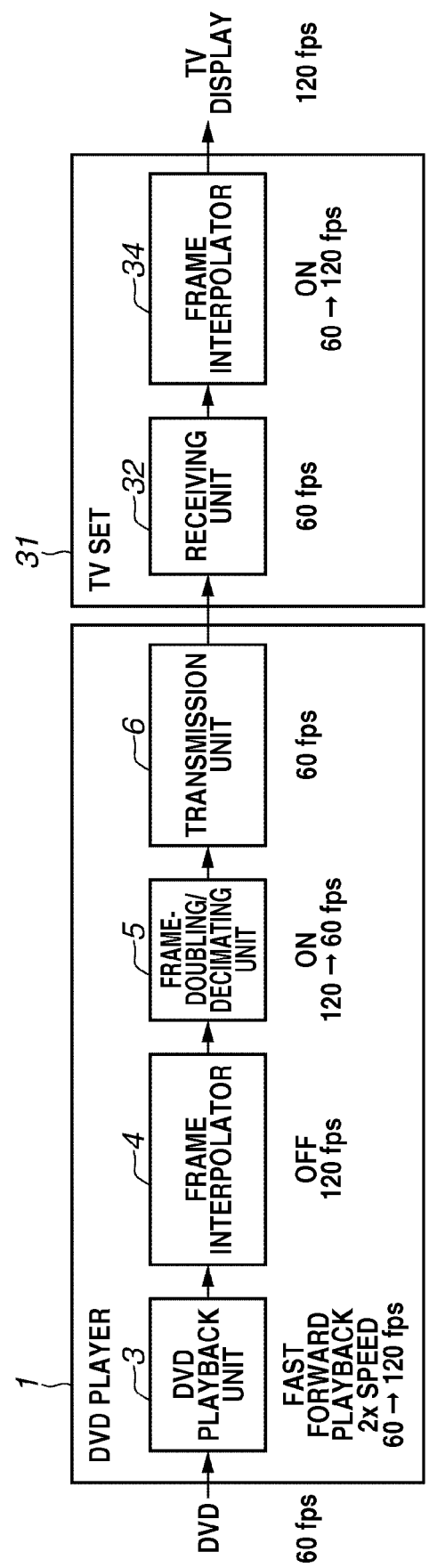
FIG. 11 is a diagram illustrating transition processes of a frame rate in a conventional 2× speed fast forward playback mode.
Figure 12:
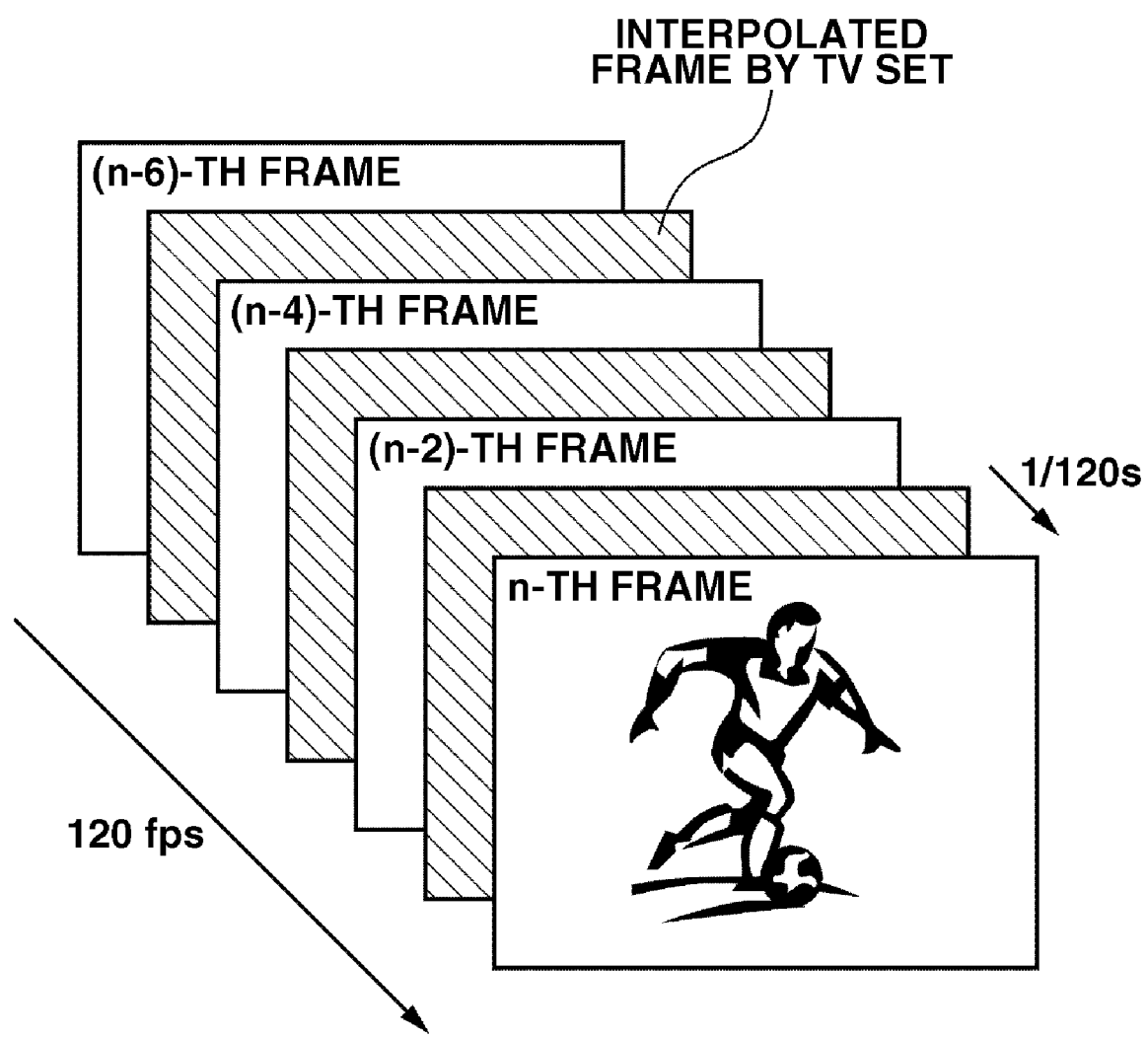
FIG. 12 is a diagram illustrating a display frame structure in the conventional 2× speed fast forward playback mode.
Figure 13:
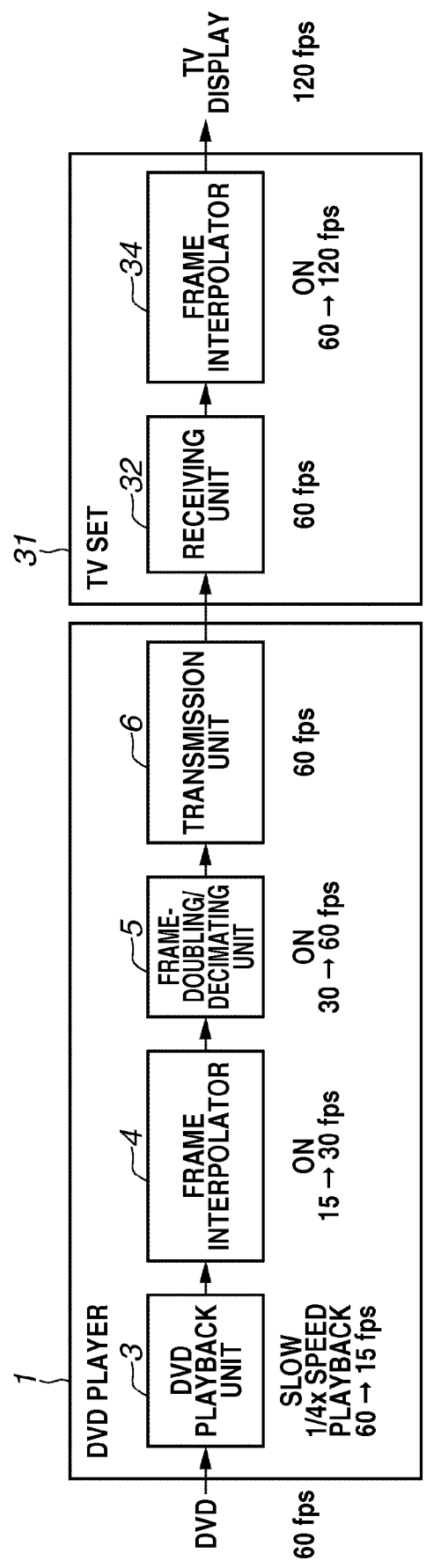
FIG. 13 is a diagram illustrating transition processes of a frame structure in a conventional ¼× speed slow playback mode.
Figure 14:
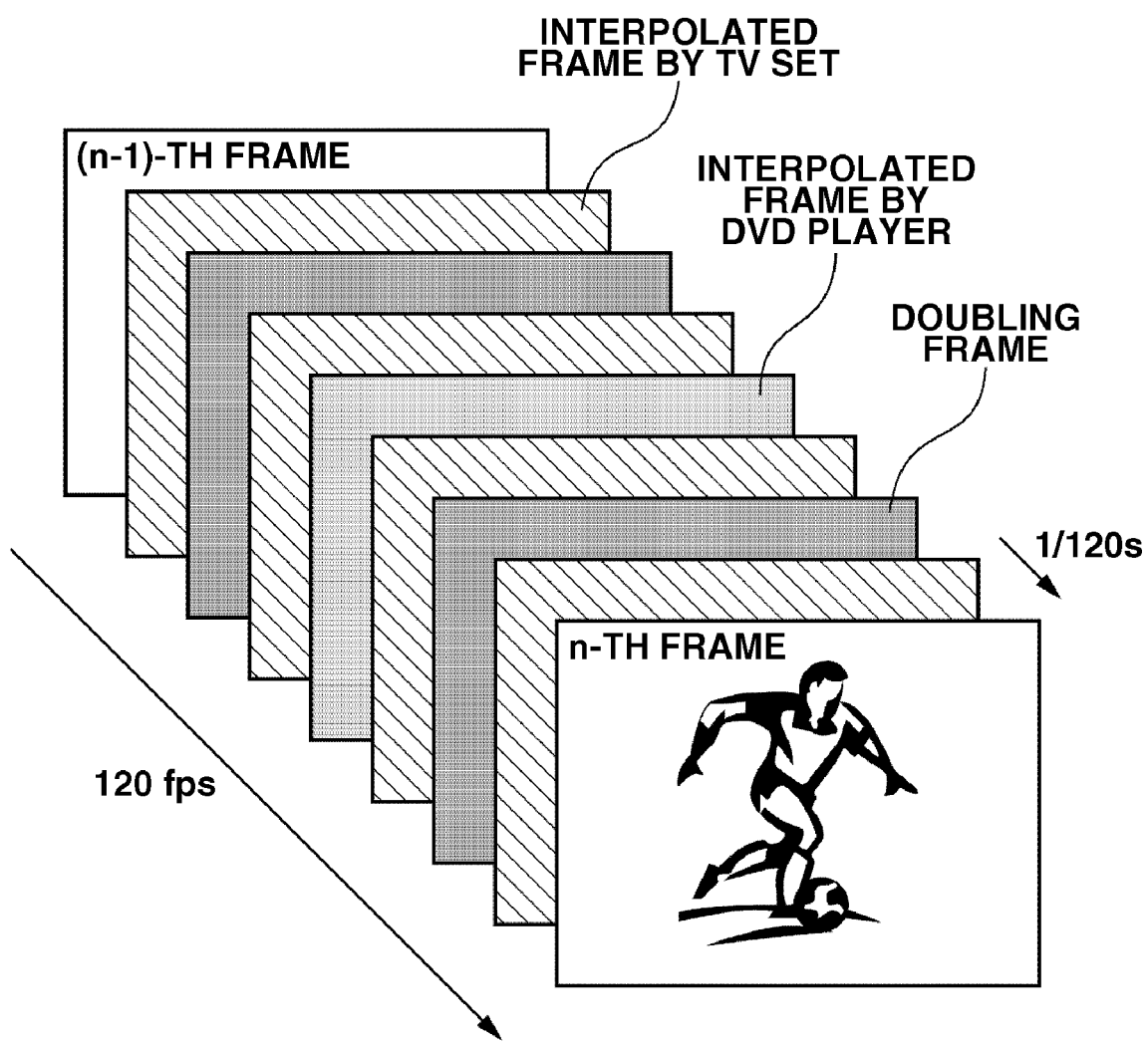
FIG. 14 is a diagram illustrating a display frame structure in the conventional ¼× speed slow playback mode.

FIG. 9 schematically illustrates the frame image to be displayed. FIG. 10 illustrates transition processes until the frame image becomes a display frame image. Original video 101 of the DVD is output at slow ¼× speed as a DVD playback unit output 107, and converted to a frame interpolator output 108. More specifically, a frame A-B which is generated from frames A and B is interpolated to the DVD playback unit output 107. Next, the frame image is output as a frame doubling/decimating unit output 109 without changes. Then, the frame image is output as a frame interpolator output 110. More specifically, a frame A-[A-B] which is generated from the frames A and A-B, and a frame [A-B]-B which is generated from the frames A-B and B, are interpolated to the frame doubling/decimating unit output 109. In other words, the video is displayed with a smooth motion since the display frame images are structured with the interpolated frames which are not doubling frames.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-025237 filed Feb. 5, 2008, which is hereby incorporated by reference herein in its entirety.

What is claimed is:

1. A playback apparatus comprising:
    a conversion unit that converts a frame rate of video data; and
    a control unit, wherein the control unit controls not to perform a first process before first video data is transmitted to a display apparatus if a frame rate of the first video data is equal to or more than a first predetermined frame rate, wherein the first video data includes video data which is reproduced if a slow playback is instructed to the playback apparatus, and the first process includes a process for reducing number of frames included in the first video data, wherein the control unit controls to perform a second process if the frame rate of the first video data is equal to or more than the first predetermined frame rate, wherein the second process includes a process for increasing number of frames included in video data received by the display apparatus, wherein the control unit controls to generate second video data by performing a third process if the frame rate of the first video data is not more than the first predetermined frame rate, wherein the third process includes a process for increasing number of frames included in the first video data, and wherein the control unit controls to transmit the second video data to the display apparatus if the frame rate of the first video data is not more than the first predetermined frame rate.

2. The playback apparatus according to claim 1, wherein the control unit controls not to perform the second process if the frame rate of the first video data is not more than the first predetermined frame rate.

3. The playback apparatus according to claim 1, wherein the control unit controls not to perform fourth process before third video data is transmitted to the display apparatus if a frame rate of the third video data is not equal to or more than a second predetermined frame rate, wherein the third video data includes video data which is reproduced if a fast forward is instructed to the playback apparatus, and the fourth process includes a process for reducing number of frames included in the third video data.

4. The playback apparatus according to claim 3, wherein the control unit controls not to perform the second process if the frame rate of the third video data is not equal to or more than the second predetermined frame rate.

5. The playback apparatus according to claim 3, wherein the control unit controls to generates fourth video data by performing fifth process if the frame rate of the third video data is more than the second predetermined frame rate, the fifth process includes a process for reducing number of frames included in the third video data, and the control unit controls to transmit the fourth video data to the display apparatus if the frame rate of the third video data is more than the second predetermined frame rate.

6. A method of controlling a playback apparatus, the method comprising:
converting a frame rate of video data; and
controlling, wherein controlling includes
controlling not to perform a first process before first video data is transmitted to a display apparatus if a frame rate of the first video data is equal to or more than a first predetermined frame rate, wherein the first video data includes video data which is reproduced if a slow playback is instructed to the playback apparatus, and the first process includes a process for reducing number of frames included in the first video data,
controlling to perform a second process if the frame rate of the first video data is equal to or more than the first predetermined frame rate, wherein the second process includes a process for increasing number of frames included in video data received by the display apparatus,
controlling to generate second video data by performing a third process if the frame rate of the first video data is not more than the first predetermined frame rate, wherein the third process includes a process for increasing number of frames included in the first video data, and
controlling to transmit the second video data to the display apparatus if the frame rate of the first video data is not more than the first predetermined frame rate.

7. The method according to claim 6, wherein controlling further includes controlling not to perform the second process if the frame rate of the first video data is not more than the first predetermined frame rate.

8. The method according to claim 6, wherein controlling further includes controlling not to perform fourth process before third video data is transmitted to the display apparatus if a frame rate of the third video data is not equal to or more than a second predetermined frame rate, wherein the third video data includes video data which is reproduced if a fast forward is instructed to the playback apparatus, and the fourth process includes a process for reducing number of frames included in the third video data.

9. The method according to claim 8, wherein controlling further includes controlling not to perform the second process if the frame rate of the third video data is not equal to or more than the second predetermined frame rate.

10. The method according to claim 8, wherein controlling further includes controlling to generate fourth video data by performing fifth process if the frame rate of the third video data is more than the second predetermined frame rate, wherein the fifth process includes a process for reducing number of frames included in the third video data, and includes
controlling to transmit the fourth video data to the display apparatus if the frame rate of the third video data is more than the second predetermined frame rate.

11. A non-transitory storage medium storing a program executed by for a computer, wherein the program for using the computer to perform a method of controlling a playback apparatus, the method comprising:
converting a frame rate of video data; and
controlling, wherein controlling includes
controlling not to perform a first process before first video data is transmitted to a display apparatus if a frame rate of the first video data is equal to or more than a first predetermined frame rate, wherein the first video data includes video data which is reproduced if a slow playback is instructed to the playback apparatus, and the first process includes a process for reducing number of frames included in the first video data,
controlling to perform a second process if the frame rate of the first video data is equal to or more than the first predetermined frame rate, wherein the second process includes a process for increasing number of frames included in video data received by the display apparatus,
controlling to generate second video data by performing a third process if the frame rate of the first video data is not more than the first predetermined frame rate, wherein the third process includes a process for increasing number of frames included in the first video data, and
controlling to transmit the second video data to the display apparatus if the frame rate of the first video data is not more than the first predetermined frame rate.

* * * * *